United States Patent [19]

Fernandes et al.

[11] Patent Number: 6,122,261
[45] Date of Patent: *Sep. 19, 2000

[54] HITLESS ULTRA SMALL APERTURE TERMINAL SATELLITE COMMUNICATION NETWORK

[75] Inventors: Roosevelt A. Fernandes, Chino Hills, Calif.; Kurt P. Krabbe, Bountiful, Utah; Haynes Ellis, Jr., Chino Hills, Calif.

[73] Assignee: Southern California Edison Company, Rosemead, Calif.

[ * ] Notice: This patent is subject to a terminal disclaimer.

[21] Appl. No.: 08/916,613

[22] Filed: Aug. 22, 1997

Related U.S. Application Data

[63] Continuation of application No. 08/305,147, Sep. 13, 1994, Pat. No. 5,708,679, which is a continuation-in-part of application No. 08/029,897, Mar. 11, 1993, Pat. No. 5,379,320.

[51] Int. Cl.[7] .............................. H04J 13/00; H04B 15/00
[52] U.S. Cl. ..................... 370/320; 370/342; 370/346; 455/12.1
[58] Field of Search .................................. 370/316, 318, 370/320, 321, 332, 335, 337, 342, 346, 347; 342/352, 353, 354, 368, 376; 343/810, 812, 814, 700 MS; 375/130, 131, 140; 455/11.1, 12.1, 13.1, 13.2, 13.4

[56] References Cited

U.S. PATENT DOCUMENTS

| | | | |
|---|---|---|---|
| 4,071,846 | 1/1978 | Oltman, Jr. ...................... | 343/700 MS |
| 4,251,865 | 2/1981 | Moore et al. ............................ | 370/346 |
| 4,455,651 | 6/1984 | Baran ..................................... | 370/320 |
| 4,808,916 | 2/1989 | Smith-Vaniz ............................ | 324/110 |
| 4,901,307 | 2/1990 | Gilhousen et al. ...................... | 370/320 |
| 4,943,811 | 7/1990 | Alden et al. ............................. | 343/814 |
| 4,979,170 | 12/1990 | Gilhousen et al. ...................... | 370/321 |
| 5,006,855 | 4/1991 | Braff ........................................ | 342/357 |
| 5,073,900 | 12/1991 | Mallinckrodt ........................... | 370/320 |
| 5,313,457 | 5/1994 | Hostetter et al. ........................ | 370/320 |
| 5,450,395 | 9/1995 | Hostetter et al. ........................ | 370/320 |
| 5,455,594 | 10/1995 | Blasing et al. ................... | 343/700 MS |

Primary Examiner—Alpus H. Hsu
Attorney, Agent, or Firm—Oppenheimer, Wolff & Donnelly

[57] ABSTRACT

A communication network includes multiple mini-hub terminals for transmitting and receiving information from multiple remote terminals. Some of the multiple mini-hub terminals, and some of the multiple remote terminals are capable of wireless communication respectively with each other through satellite communication means. A co-located terminal is hard wire connected with at least some of the mini-hub terminals. At least some of the terminals includes a flat antenna comprising a ground plane and a substrate forming at least one in flat array antenna mounted relative to the ground plane. The flat array antenna has multiple spaced dipoles formed on the substrate to constitute the array, and a transmission line formed on the substrate connecting the spaced dipoles. The transmission line is for connection with a link to a terminal with which communication is to be affected by signals through the antenna. A mobile antenna has beam steering lenses for forcing the signal. Also provided are sensors located on power transmission lines, the sensor being capable of measuring travelling waves on the lines, and communicating via an array antennal through a satellite at KU, KA-band or L-band frequencies, characteristics of the travelling wave thereby to facilitate fault location on the transmission lines.

6 Claims, 12 Drawing Sheets

USAT NETWORK CONFIGURATION

USAT NETWORK CONFIGURATION

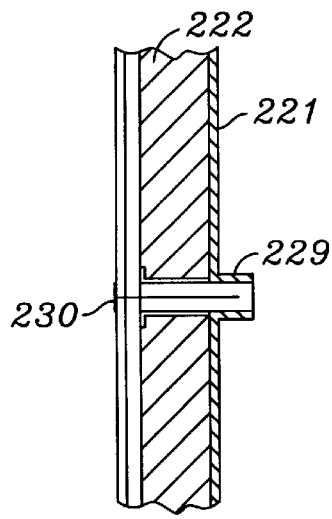
FIG. 5C
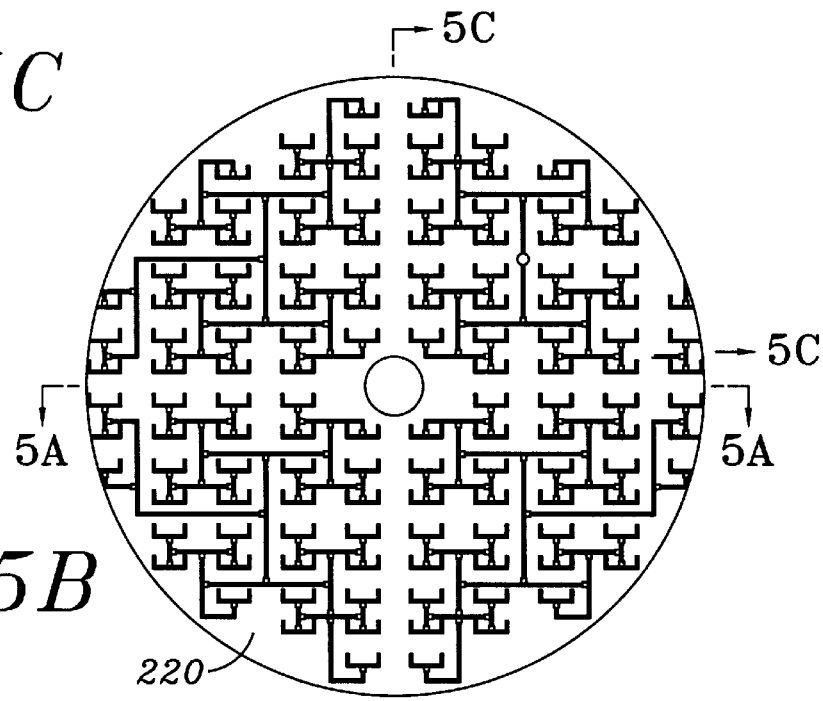
FIG. 5A
FIG. 5B
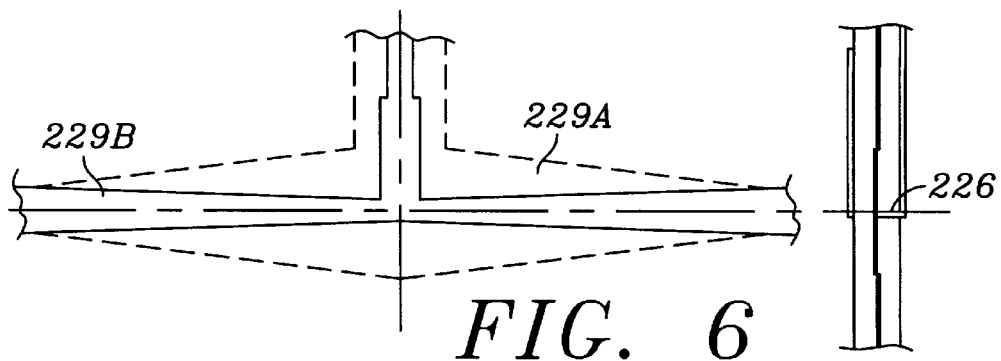
FIG. 6

HITLESS ULTRA SMALL APERTURE TERMINAL SATELLITE COMMUNICATION NETWORK

RELATED APPLICATION

This is a continuation application of application Ser. No. 08/305,147, filed Sep. 13, 1994, by Roosevelt A. Fernandes, et al., entitled "HITLESS ULTRA SMALL APERTURE TERMINAL SATELLITE COMMUNICATION NETWORK" now U.S. Pat. No. 5,708,679, which is a continuation-in-part of U.S. patent application Ser. No. 08/029,897, filed Mar. 11, 1993, by Roosevelt A. Fernandes et al., entitled "HITLESS ULTRA SMALL APERTURE TERMINAL SATELLITE COMMUNICATION NETWORK", now U.S. Pat. No. 5,379,320. The contents of those applications are herein incorporated by reference.

BACKGROUND

The operation of a mini-hub and multiple remote terminals in a hitless or a non-redundant configuration is described in the parent application. The present invention is concerned with multiple mini-hub satellite earth stations communicating with numerous remote satellite earth stations.

In order to maintain communication in the event of equipment failure, catastrophic events, or a change in a Regional Control Center responsibility for selected remote terminals, it is desirable to develop a mesh mini-hub network topology. This will allow communications to be rerouted to Regional Control Centers without taking down any portion of the operating network.

With prior technology it has not been possible to develop an Ultra Small Aperture Terminal (USAT) or Very Small Aperture Terminal (VSAT) Code Division Multiple Access (CDMA) satellite communications network using spread spectrum encoded signals communicating with discontinuous signals from multiple hubs. This capability is essential to allow multiple mini-hubs to communicate with numerous remote terminals.

In order to maintain communication in the event of equipment failure, redundant equipment is implemented which is normally in a standby mode. It is desirable to eliminate redundant standby equipment for fail safe operation by utilizing the redundant equipment for other functions that can be interrupted prior to assuming the standby role.

Reference frequency oscillators used in communications equipment, experience frequency variations due to changes in ambient environmental temperatures and aging. These variations need to be kept to a minimum and accommodated in the integration of the RF and baseband equipment.

Conventional high gain antennas operating in high frequency bands ranging from C- band to Ka-band frequencies are constructed from wave-guide feedhorns with dish antennas, radiating slots or micro-strip patches, and usually have less bandwidth, than is achievable. The prior art utilized all unbalanced circuitry for transmission/reception and radiation from the array.

The prior art does not disclose the use of passive balanced arrays for fixed or mobile antennas. The prior art uses active arrays that are considerably more expensive than necessary.

The accuracy of prior art power system fault location schemes have been limited by the inability to synchronize sensors separated by hundreds of miles to within 0.3 to 0.5 micro-seconds. The use of series capacitor banks on power transmission lines has made it considerably more difficult for 60-cycle frequency or impedance-based fault location methods to work effectively. Other problems include large fault inspection and clearing times, high ground resistance, lack of visual evidence of a fault in some instances, and problems due to reflections experienced by conventional time domain reflectometers.

SUMMARY

According to the invention, a communication network comprises multiple mini-hub terminals for transmitting information. There are multiple remote terminals. Some of the multiple mini-hub terminals, and some of the multiple remote terminals are capable of wireless communication respectively with each other through satellite communication means.

A co-located Ultra Small Aperture Terminal (USAT) or VSAT terminal is hard wire connected with at least some of the multiple mini-hub terminals and the co-located USAT or VSAT terminal is also in communication with the satellite communication means. This facilitates coordination of signals received from multiple mini-hub terminals and at least one of the remote terminals serving to synchronize the entire network.

A communication terminal for communicating at least in part through satellite communication means comprises means for sensing temperature at the remote terminal. The terminal includes means for utilizing a local reference frequency for acquisition and tracking of a received carrier frequency from the satellite communication means. The temperature sensing means is coupled to the reference frequency means, and means for voltage controlling the reference frequency means maintains a match to a carrier frequency received from the satellite communication means. Means is provided for determining and storing the controlled voltage versus temperature in a memory of the terminal, and there is means for relating the controlled voltage relative to the temperature. Dynamic calibration for maintaining a match between the local reference frequency and the carrier frequency is achieved through an adaptive algorithm.

By a further aspect of the invention, a flat array antenna comprises a ground plane, and a substrate forming the dielectric support for at least one etched conductive flat array antenna mounted relative to the ground plane. In combination with a second array aligned on the reverse side of the same substrate or a second substrate forms an antenna for the transmit frequency, for example. A similar pair of etched arrays with dimensions suitable for the receive frequency band constitutes the receive antenna with the same ground plane. The flat array antenna has multiple spaced dipoles formed on the substrate to constitute the array. A transmission line formed on the substrate connects the spaced dipoles. Efficient power dividers are used to connect the transmission lines and ultimately the RF terminal with which communication is to be affected by signals through the antenna, at the transmit and receive frequencies.

In terms of yet a further aspect of the invention, a communication network comprises at least one sensor located in close relationship with a power transmission line, and communication means on the sensor. The sensor includes means for measuring at least one electrical parameter associated with the power transmission line. Antenna means located on the sensor communicates a sensed parameter through wireless communication or via satellite to a remote location. The antenna on the sensor is an array located in a planar manner on a surface of the sensor, and the array includes multiple spaced dipoles formed substantially parallel with the surface. Alternatively the array may be suspended above or below the sensor module for ease of alignment with a geosynchronous satellite.

There is means on the sensor for synchronizing signals from the sensor with a GPS signal. Means is also provided for tagging a traveling wave on a power transmission line in relation to time thereby to facilitate measuring location of a fault on a power transmission line.

A USAT network of the present invention employs multiple mini-hubs. These hubs are deployed in a mesh architecture, with a USAT terminal collocated with each mini-hub. Each mini-hub terminal transmits a packet of information consisting of a preamble plus a series of bits. The transmissions are spread spectrum encoded to reduce power spectral density and thereby allows reception by small aperture antennas.

The multiple mini-hub terminals transmit their packets in a sequential manner each within an allocated time slot. This creates a Time Division Multiple Access capability for the spread spectrum encoded signals.

Each remote terminal receives the sequence of packets, each packet represents a non-continuous signal since they are transmitted by different mini-hub terminals. Using the numerical processing techniques described in the parent application, the remote terminal acquires the spread spectrum code phase and signal frequency with no loss of transmission time. In order to facilitate the acquisition, the signals transmitted by each mini-hub terminal are close to one another with regard to signal frequency and spread spectrum code phase.

The remote USAT terminal collocated with each mini-hub terminal communicates with the mini-hub terminal through a direct interface. The remote USAT terminal transfers received data packets plus variations in spread spectrum code phase and signal frequency to the mini-hub terminal.

Any one mini-hub terminal can be designated the master. All other mini-hub terminals located at various Regional Control Centers adjust their spread spectrum code phases and their frequencies to align with the master mini-hub terminal. In this manner, all the spread spectrum code phases and frequencies of the various mini-hub terminals are maintained close to one another and allow reception by all the remote terminals.

Using these techniques in conjunction with the disclosure of the parent application, two-way communication is established between any remote terminal and any mini-hub terminal. Each remote terminal receives the packet from all mini-hub terminals. Each mini-hub terminal in turn receives the transmission from all remote USAT terminals. Mini-hub terminals may directly communicate with other mini-hub terminals via their collocated remote USAT terminal.

A missing packet in the data set transferred from the remote terminal to the mini-hub terminal would indicate a failure of the mini-hub terminal corresponding to that packet. Based on an apriori redundancy plan, the designated mini-hub terminal can take over the function of the failed mini-hub terminal in the mesh architecture.

The parent application describes remote USAT terminal communications equipment which utilizes a local reference frequency for acquisition and tracks the received carrier frequency during normal communications. The local reference frequency is voltage controlled to maintain a close match to the carrier frequency.

The USAT remote terminal in the present invention incorporates a temperature sensor which is tightly coupled to the reference frequency circuit.

During periods of stable frequency track, the controlled voltage versus temperature is determined and stored in a non-volatile memory. As the temperature of operation fluctuates based on weather conditions, a mathematical table is established which relates reference frequency voltage of a VCXO to temperature. An adaptive algorithm allows elimination of such a table once a calibration curve is established over time. This table provides a relationship for corrected temperature and aging since it is updated on a continual basis. An algorithm is also incorporated that could allow the correlation to be fine tuned using an adaptive temperature compensation scheme. Moreover, the algorithm is adaptive for crystal vibration and thermal shock associated with the communication system at the USAT remote terminals.

Should reacquisition be necessary due to a loss of power or any other condition, the temperature is measured and the mathematical table or learning algorithm is utilized to establish the reference frequency control voltage.

Also according to the invention there is provided a mobile antenna using a passive balanced array. The present invention discloses realizing a low-profile beam steering antenna operating at selected gains and frequency bands that normally in the prior art require wave guide structures. The present invention uses a printed circuit balanced line set dipole radiators operating in an array, phased for broad side radiation.

Beam steering for a mobile antenna is accomplished by a pair of lenses. This technique facilitates mass production of a low-cost, low-profile high gain antenna with both frequency and polarization diversity.

A balanced array integrated X-band and Ku-band antenna is disclosed which exceeds the illuminating efficiency of a reflector and equal gain performance. A micro-strip feed structure is used and the invention features a unique approach to reducing transmission line path losses.

The X-band and Ku-band arrays are arranged to achieve minimum aperture size for the transmit/receive antenna function.

Precise location of faults on transmission lines is achieved through a combination of wireless sensor modules mounted on energized high-voltage conductors. These sensor modules measure conductor currents, voltages and phase angles with a timing accuracy better than 0.5 microseconds with respect to similar sensor modules mounted at the adjacent substations. In the event of a transmission line fault, traveling waves propagating from a fault in either direction are detected by the line-mounted sensor modules. The traveling wave created by a fault in an EHV transmission line is a broad impulse that propagates at almost the speed of light and is characterized by the rate of rise of the leading edge, signal magnitude, and frequency spectral content.

USAT conductor mounted remote terminals integrated with sensors and synchronized to GPS time at closely spaced intervals, are used to make synchronized measurements of the reflected voltage wave propagating from the fault location. Accurate time tagging of the traveling waves detected by sensor modules at adjacent substations allows precise determination of the physical fault on the line between the sensor modules. Communication between the sensor modules and the satellite USAT synchronizing terminals can be through a wireless radio link or by combining the USAT terminal at Ku or Ka-band frequencies with an array antenna on the sensor module itself energized by the power flow through the conductor. A rechargeable battery covers periods when there may not be adequate current flow through an energized power line.

Further according to the present invention balanced transmission lines feed the dipole radiators, which are spaced approximately one-quarter of a wave length above the reflective ground plane surface. Balanced radiating structures provide a broader bandwidth than unbalanced versions. Thus, the present invention has a greater gain-bandwidth product for the same physical aperture size and envelope.

By the present invention screen printing of electrical RF circuits on flexible dielectric substrate materials provides the ability to precision manufacture arrays of various sizes. This provides a cost-effective antenna even in small quantities. The present invention thus provides a low-cost beam steering array. The configuration facilitates the use of flexible printed wiring materials in the construction of dipole arrays.

Accordingly, an object of the present invention is to provide an array of dipole elements spaced above a reflecting surface, that illuminates a pair of lenses that function as a beam steering means that is more cost-effective than the prior art.

Further objectives and advantages of this invention will become apparent from the following description and drawings.

DRAWINGS

FIGS. 5A, 5B and 5C respectively depict the topographical layout of the transmission lines and dipoles.

FIG. 6 depicts an integrated power divider balun assembly.

Figure 7A:
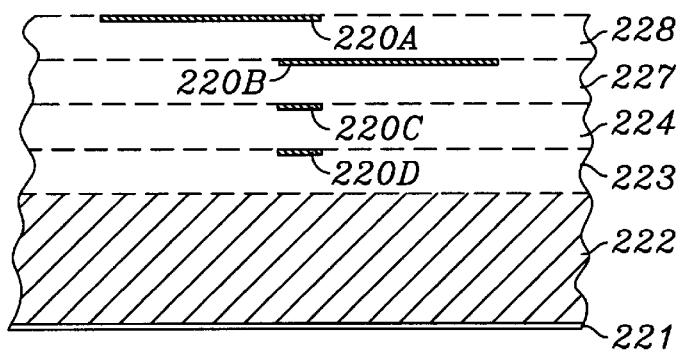
Figure 7B:
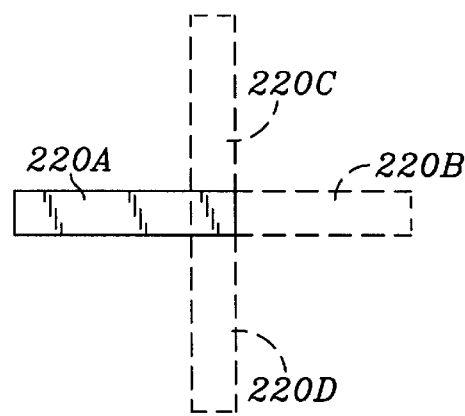

FIGS. 7A and 7B show the relative geometry of the dipoles required for polarization diversity.

Figure 8:
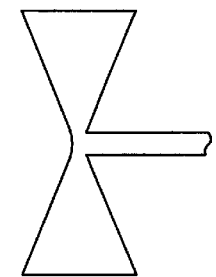

FIG. 8 depicts the bow-tie array element.

Figure 9:
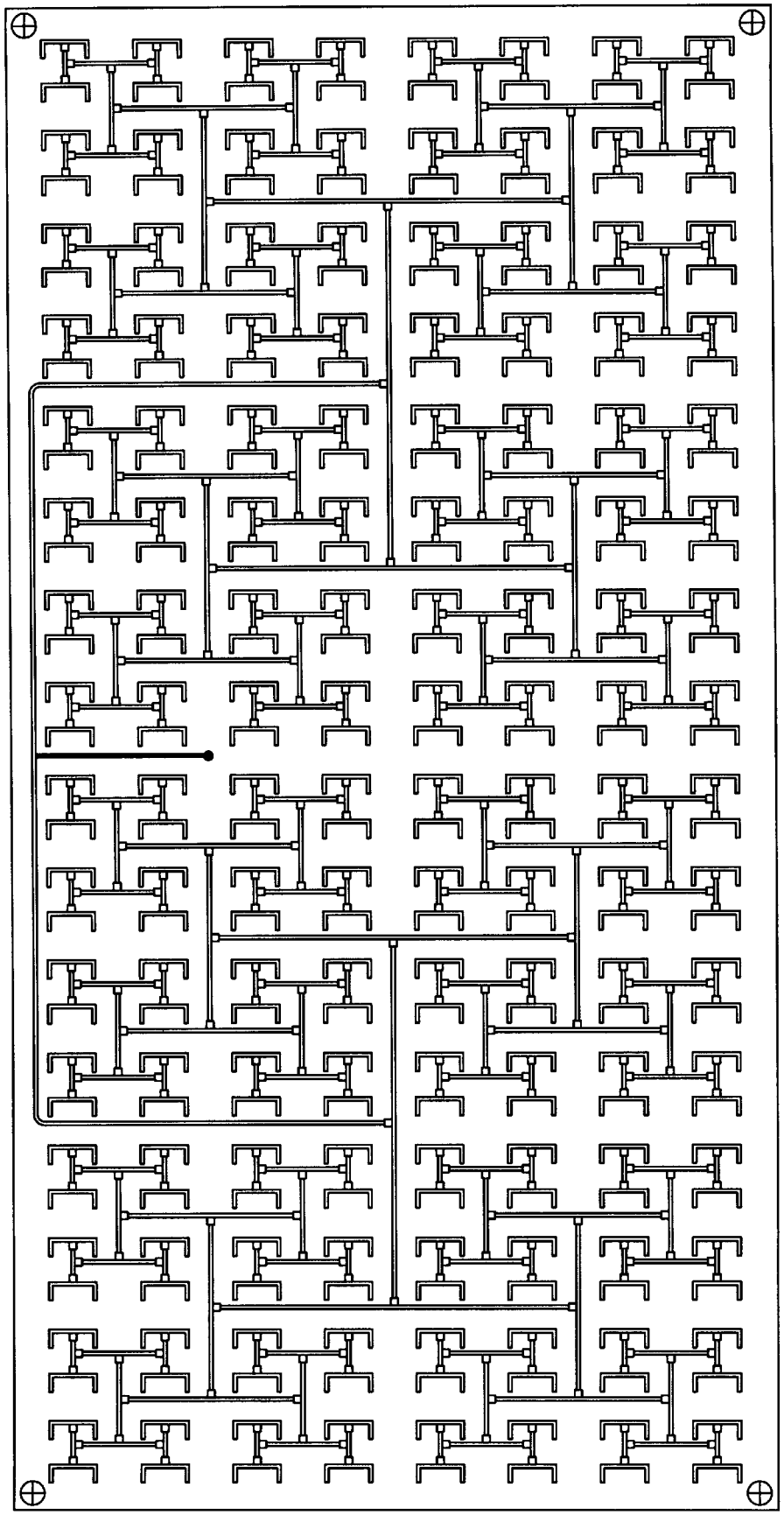

FIG. 9 depicts a front circuit view of the flat array.

Figure 10:
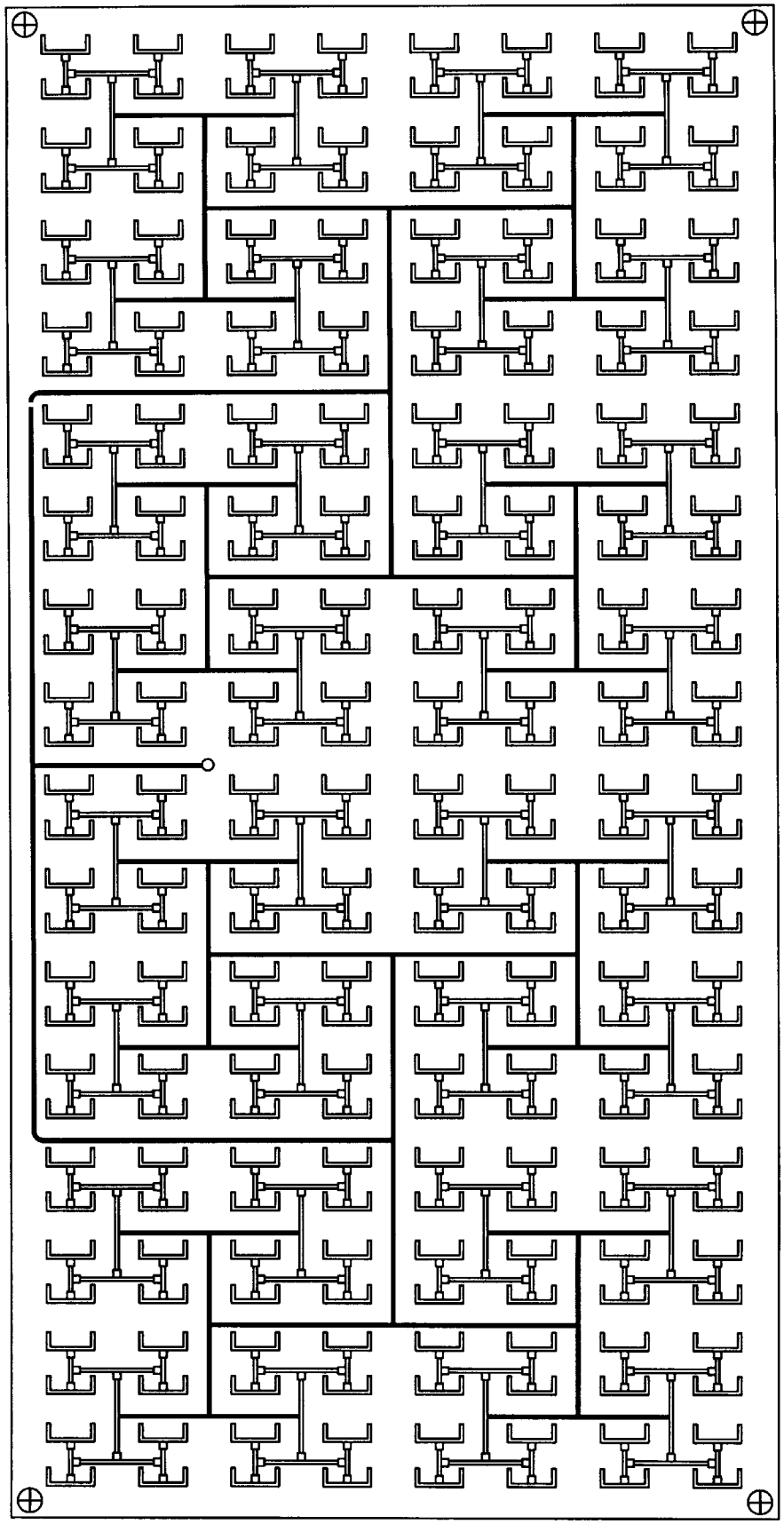

FIG. 10 depicts a front ground side view of the flat array.

Figure 11:
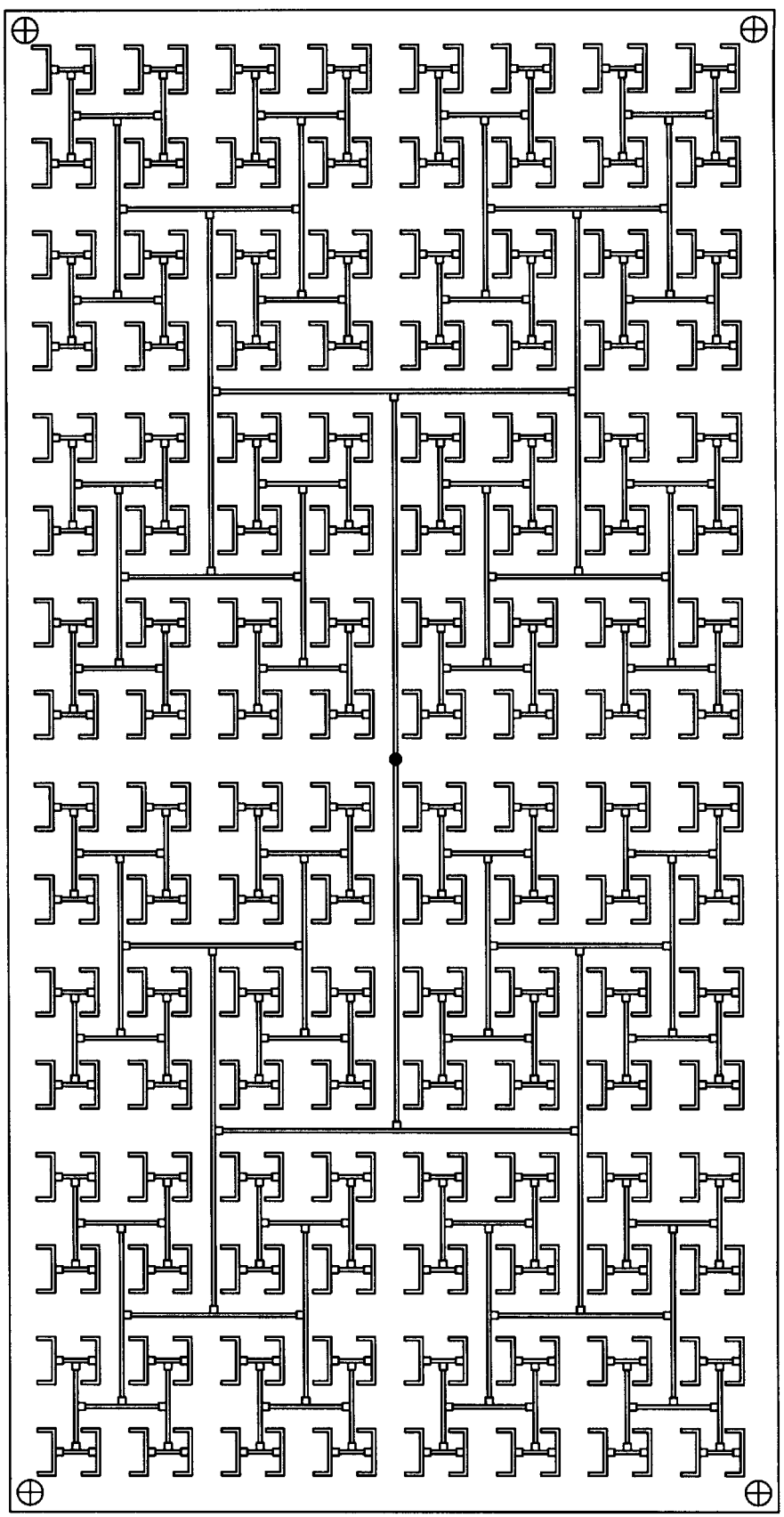

FIG. 11 depicts a front side view of the flat array.

Figure 12:
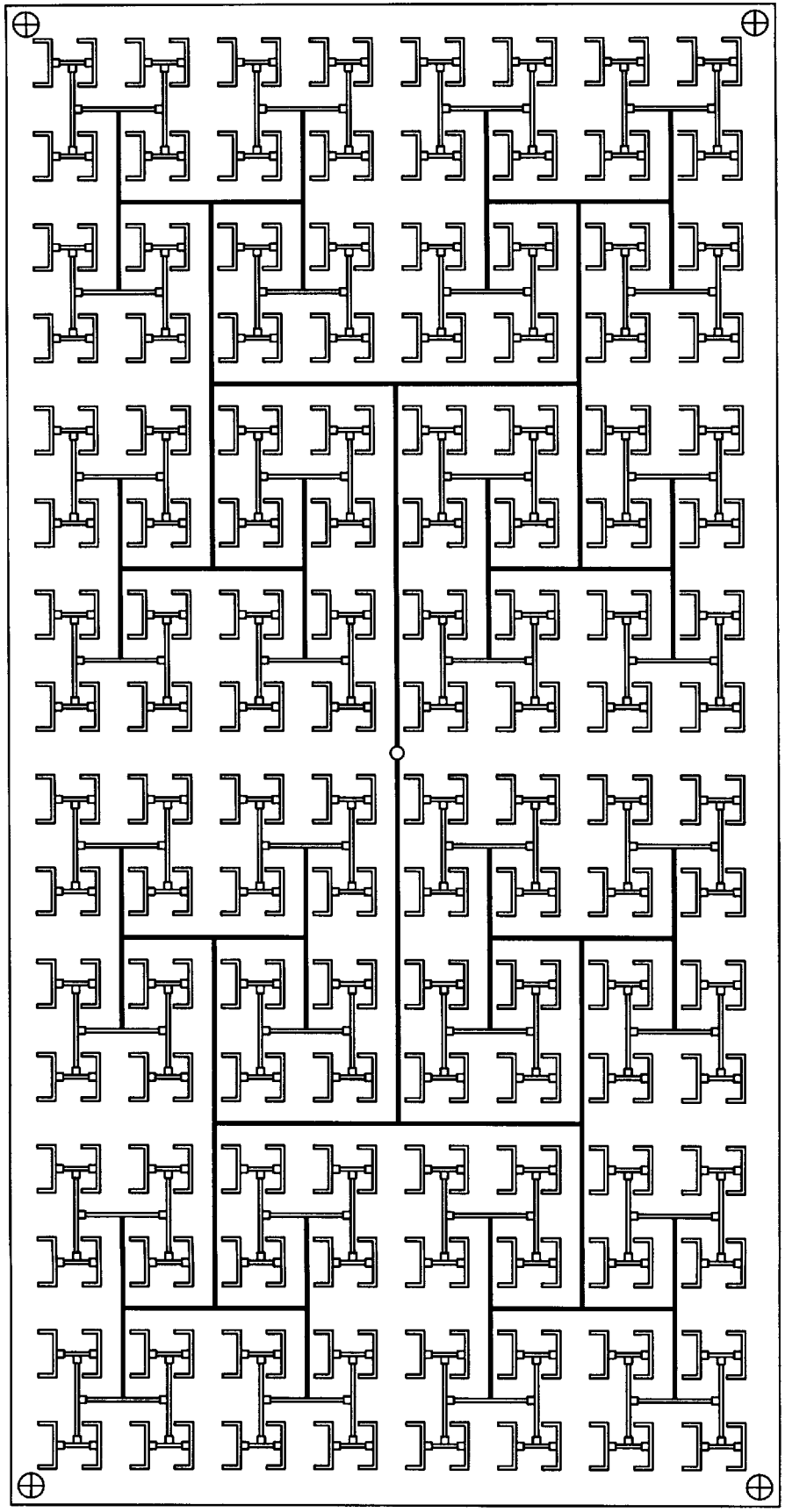

FIG. 12 depicts a ground side view of the flat array.

Figure 13A:
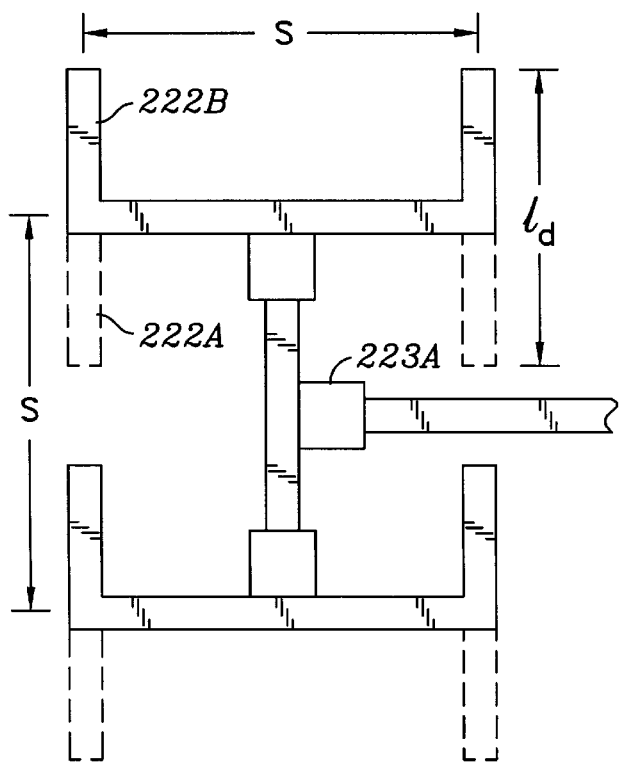
Figure 13B:
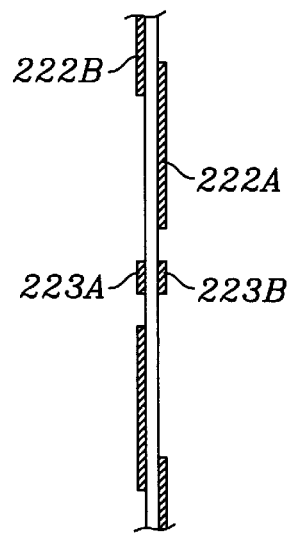

FIGS. 13A and 13B represent trace configurations for four dipoles and the connecting transmission lines.

Figure 14:
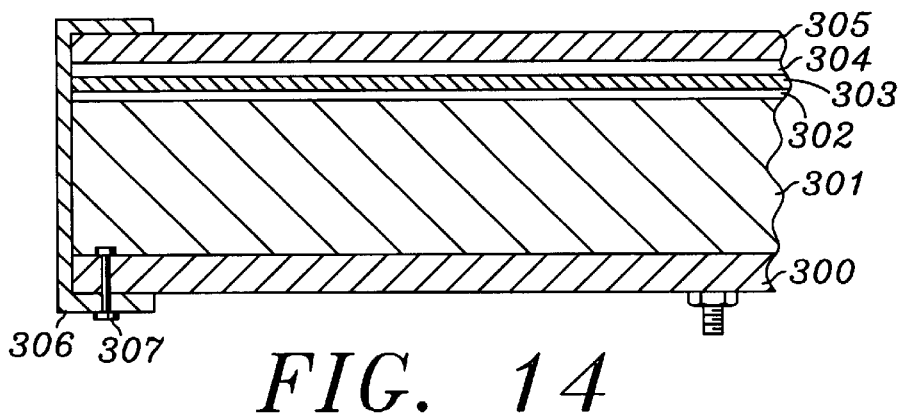

FIG. 14 depicts an antenna array assembly.

Figure 15:
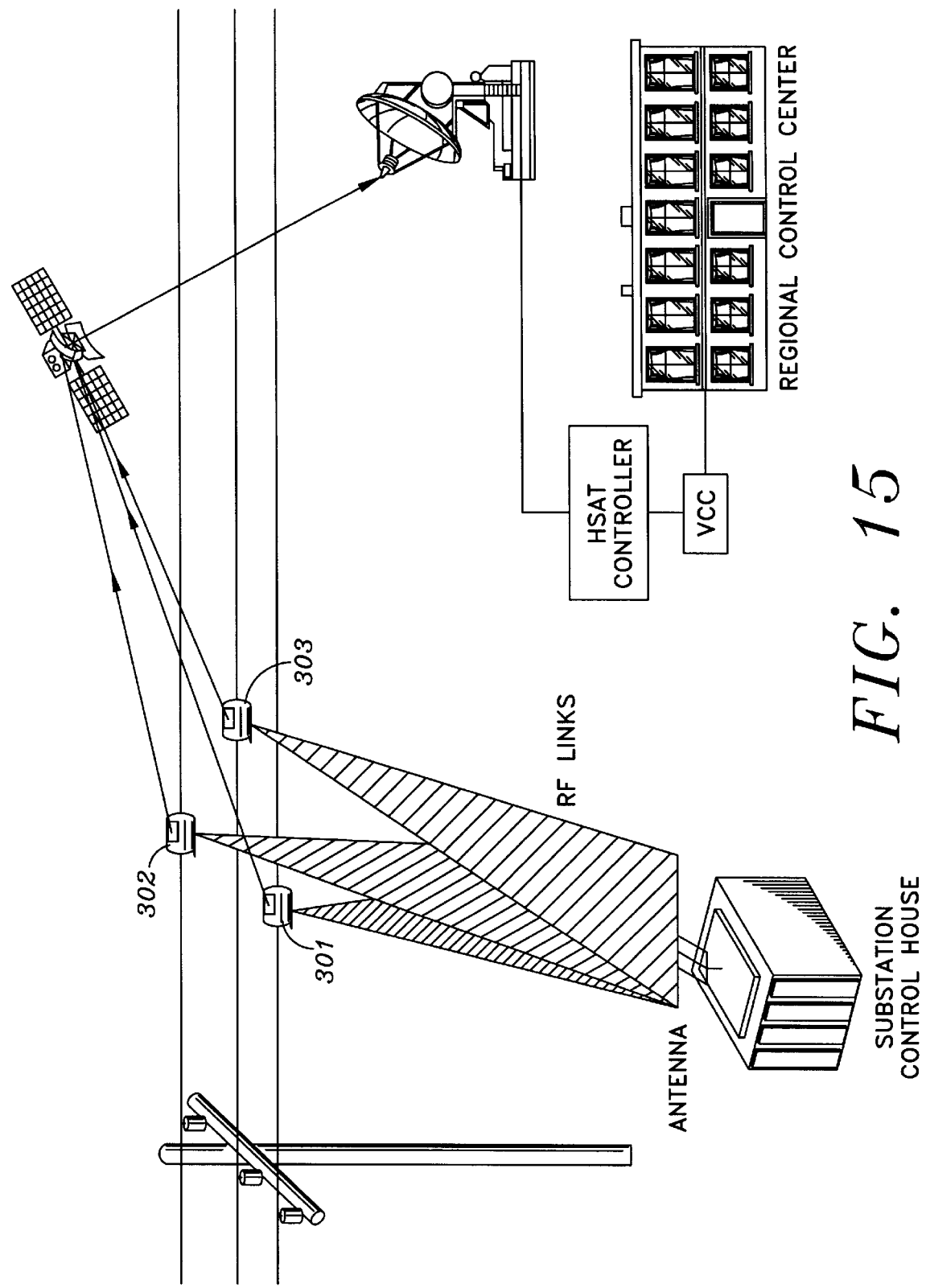

FIG. 15 depicts a configuration of a wireless power flow and relay monitoring system.

Figure 16:
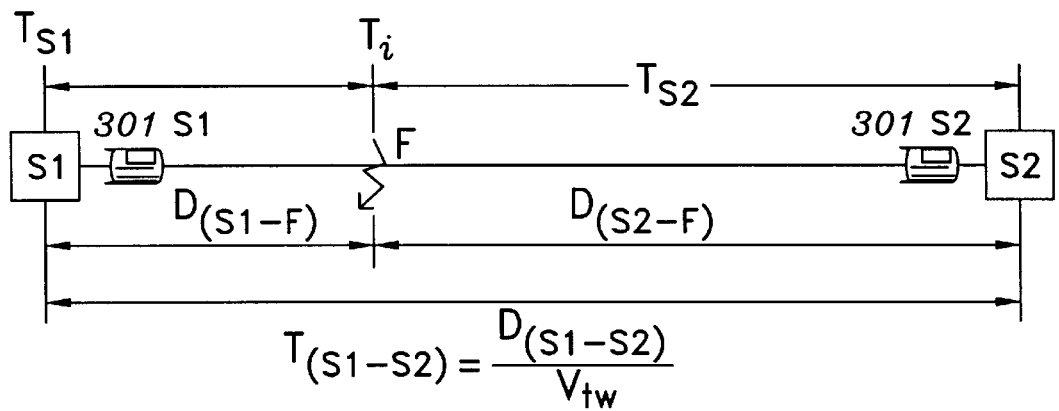

FIG. 16 depicts a traveling wave fault location configuration.

Figure 17:
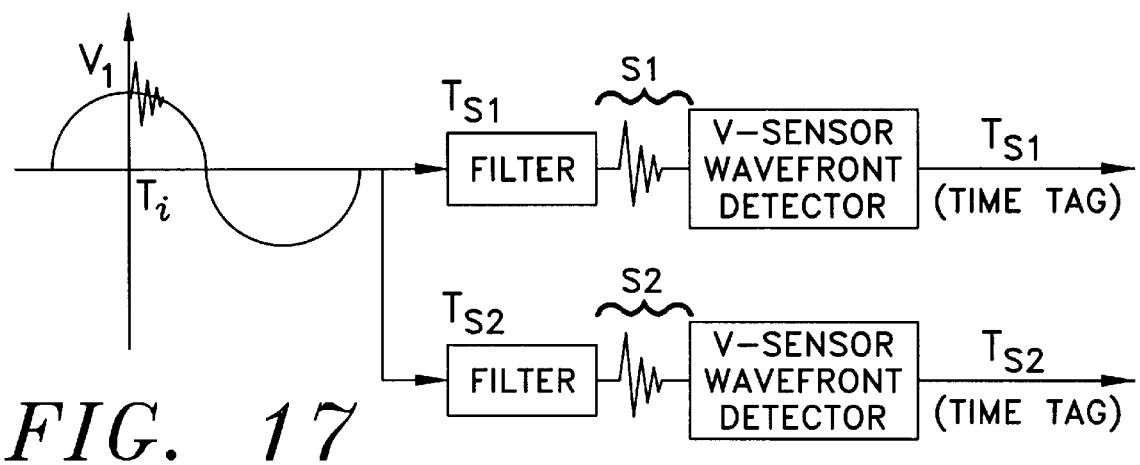

FIG. 17 depicts a traveling wave detection system.

DETAILED DESCRIPTION OF THE DRAWINGS

Figure 1:
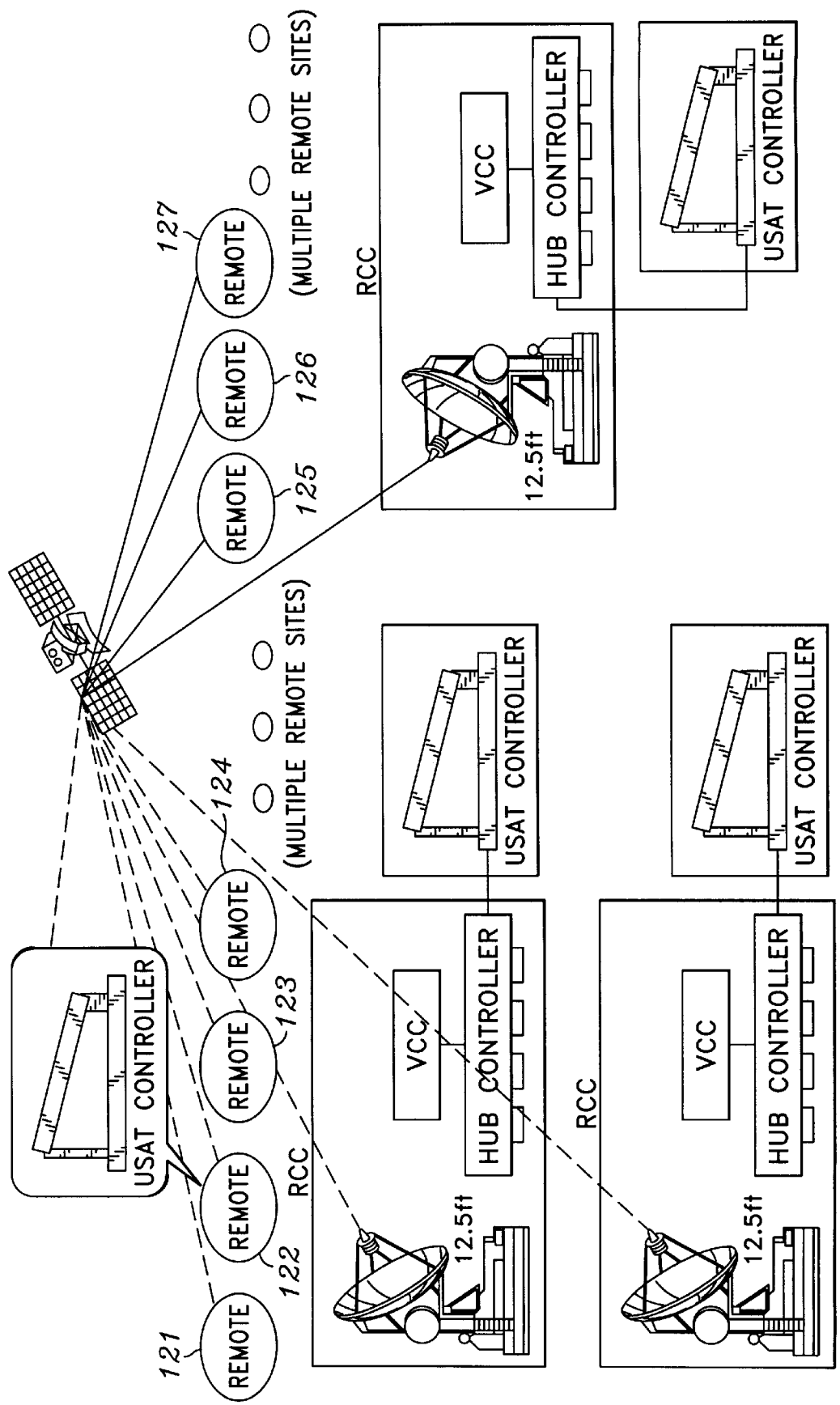
FIG. 1 is a communication system configuration using a USAT network.

A mesh mini-hub network topology as shown in FIG. 1 allows communications to be rerouted to Regional Control Centers without taking down any portion of the operating network. Each mini-hub terminal, 101, 102 and 103, etc., transmits a packet of information consisting of a preamble plus a stream of bits to remote Ultra Small Aperture Terminals (USAT) satellite earth stations 121, 122, 124, 125, 126 and 127. The transmissions are spread spectrum encoded to reduce power spectral density and allow reception of signals by remote passive, flat, USAT's: 121, 122, 124, 125, 126 and 127.

Ultra small flat aperture antennas use flat passive arrays suitable for high-volume production methods akin to fabrication of printed circuits using screen printing precision manufacturing techniques.

The multiple mini-hub terminals transmit their packets in a sequential manner each within an allocated time slot. This creates a Time Division Multiple Access capability in combination with the spread spectrum encoded signals. Each of the USAT remote terminals receives the sequence of packets, each packet representing a non-continuous signal transmitted by the different mini-hub terminals 101, 102, 103, etc. Using numerical processing techniques described in the parent application, the remote terminal acquires the spread spectrum code phase and signal frequency without losing track, as the mini-hub terminals transmit in a TDMA format. The frequency synthesizers at the remote terminals maintain track through a combination of memory, stability and superfast signal lock for small excursions, even though the mini-hub signals are discontinuous.

All mini-hub signals are synchronized through GPS derived time signals which facilitate rapid tracking and stability. In order to facilitate the acquisition, the signals transmitted by each mini-hub terminal is close to one another with regard to signal frequency and spread spectrum code phase. A USAT terminal 111, 112, 113, etc. is collocated with each mini-hub terminal and communicates with the mini-hub terminal through a direct interface. The collocated USAT terminal transfers the received data packets plus any variations in spread spectrum code phase and signal frequency to the mini-hub terminal.

Any one of the many mini-hub terminals can be designated as the master. All other mini-hub terminals adjust their spread spectrum code phases and their frequencies so that they are in alignment with the designated master mini-hub terminal. Each remote terminal receives the packets from all mini-hub terminals. Each mini-hub terminal also receives the transmissions from all remote USAT terminals. Mini-hub terminals may directly communicate with other mini-hub terminals via their collocated USAT terminals.

A missing packet in the data set transferred from the remote USAT terminal to the mini-hub terminal indicates a failure of the corresponding mini-hub terminal. Based on an apriori redundancy plan, the designated mini-hub terminal will take over the function of the failed mini-hub terminal. This enhances the overall reliability of a supervisory control and data acquisition system using satellite communications.

Temperature Correcting

USAT terminals with the controllers mounted in outdoor situations experience rapidly fluctuating temperatures, vibrations and other factors that affect the local reference frequency voltage controlled crystal oscillator, making it difficult to rapidly reacquire satellite track in the event of a temporary disruption. In order to overcome this problem in typical outdoor environments for USAT controllers incorporate a temperature sensor that is closely coupled to the reference frequency VCXO. During periods of stable frequency track, the control voltage versus temperature is determined and stored in a non-volatile memory. As the temperature of operation varies based on weather or other conditions, a mathematical table is established which relates reference frequency voltage to temperature. This table provides a means to correct for frequency variations caused by rapidly changing temperatures and crystal aging.

The correction factors are continually updated and the conditions that exist at the time of an interruption are retained for use along with the adaptive algorithms to insure rapid reacquisition of the signal from the satellite interrupted by a temporary loss of power or other condition at the USAT terminal. The temperature is measured and the mathematical table is utilized to establish the reference frequency controlled voltage under dynamic environmental conditions.

Mobile Satellite Communications Antenna

Figure 2:
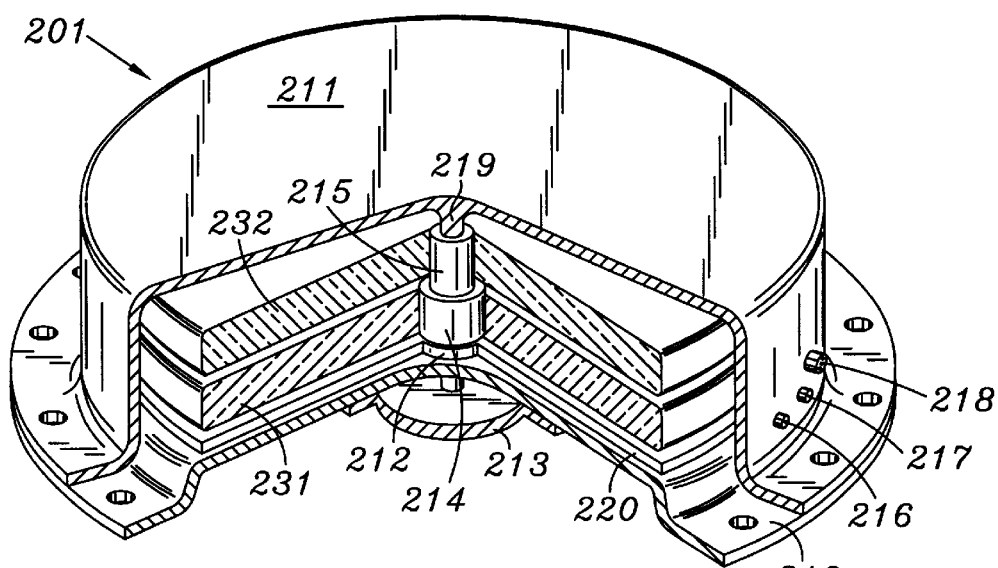
FIG. 2 is a beam steering passive antenna in accordance with the present invention. Dipole traces 222, 223 are orthogonal polarized arrays within assembly 220.

An antenna, according to this invention, is depicted in FIG. 2. A cut-away shows the relative locations of the key functional parts.

Figure 4A:
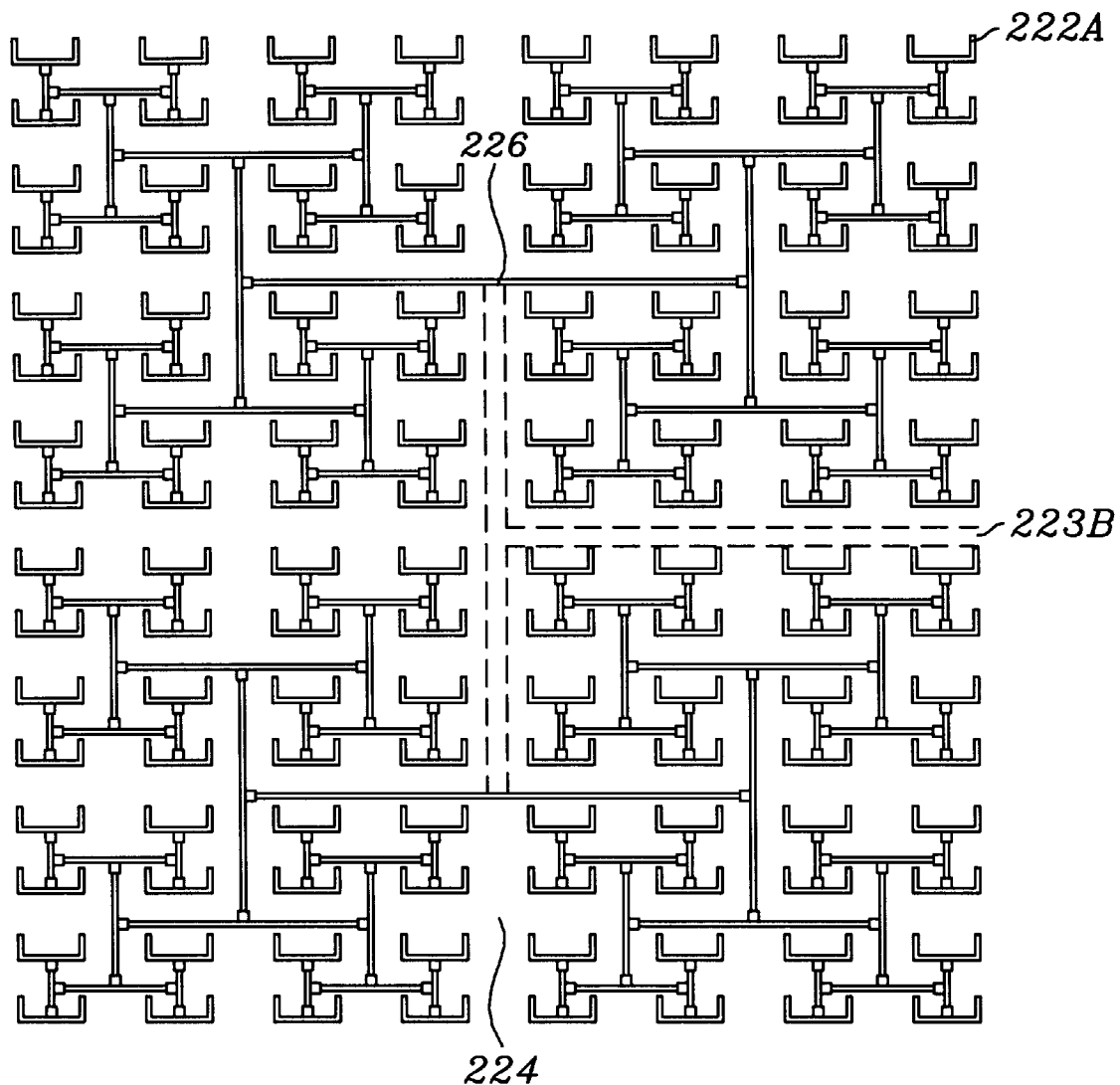
FIGS. 4A, 4B and 4C are views of the printed RF circuit traces on a dielectric substrate material to constitute array assemblies.
Figure 4B:
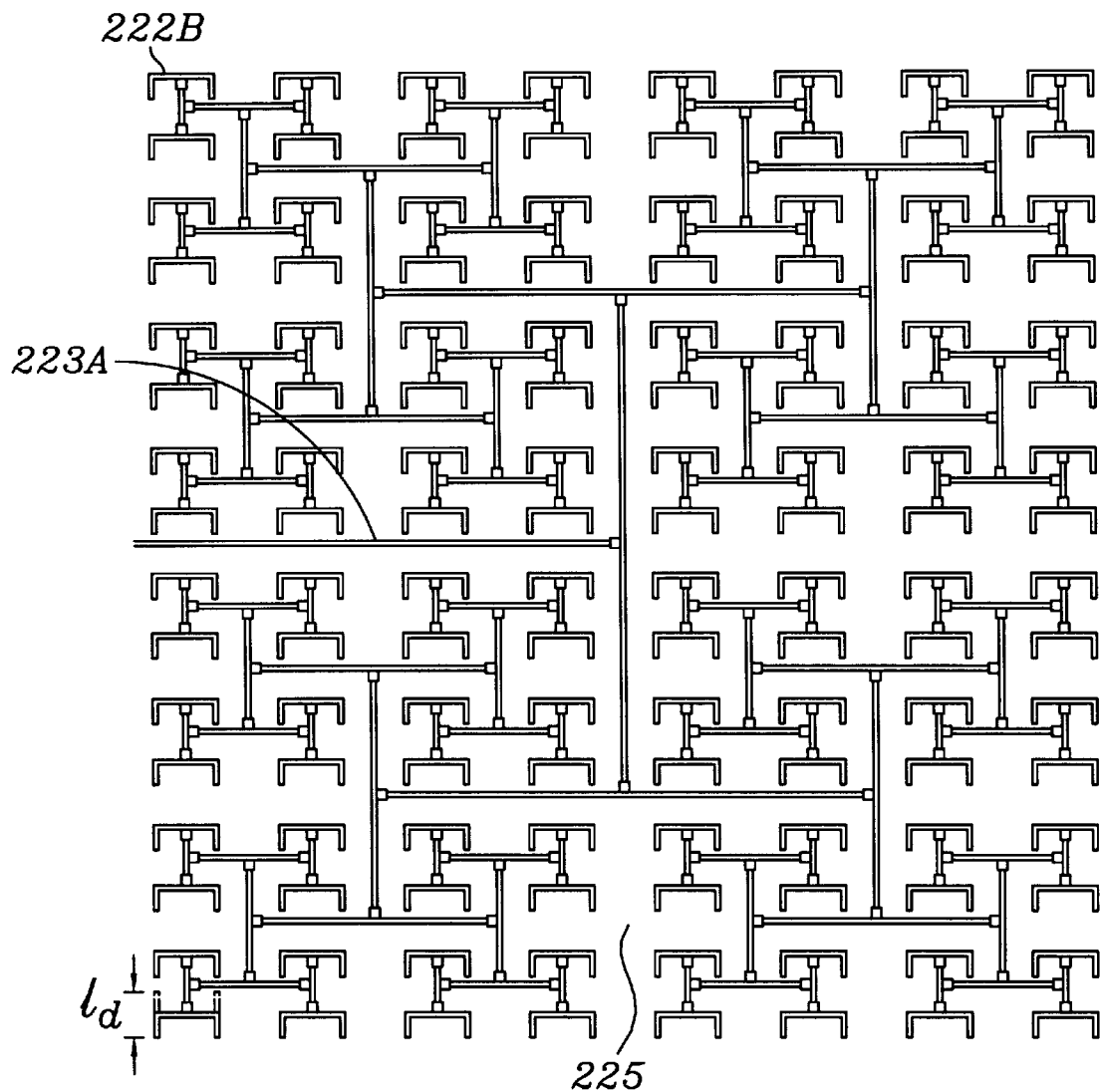
Figure 4C:
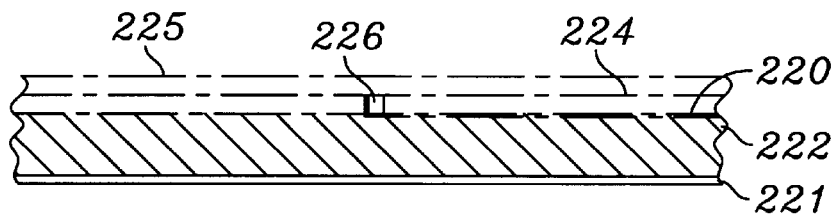

The main structural support is provided by frame 210 and radome 211, which encase the antenna, the surface of the frame 210 beneath the array 220 is reflective of RF signals to function as the ground plane 221 for the array dipoles 222 and 223, FIGS. 4A–4C.

FIGS. 4A and 4C depict a multiple layer printed circuit board with traces 222A and 222B on respective sides of the dielectric. This technique is used to minimize losses through a low impedance design of the distribution circuit that feeds the individual dipoles. Balanced transmission microstrip ground plane 223B on substrate 224 is the lower surface and is connected by feed-through interconnecting trace 226 to the upper trace 222A of the array. Printed circuit board 225 is bonded to the surface of substrate 224. This upper surface of 225 has balanced transmission microstrip trace circuitry 223A that completes the dipole array. The dipole length is indicated by ld.

The motor gear assembly 212 has three coaxial shafts 213, 214 and 215. The outer shaft 213 is attached to the array assembly 220 and rotates to provide a polarization alignment. Center shaft 214 is attached to lens 231 and inner shaft 215 is attached to lens 232. Lenses 231 and 232 rotate with respect to the array 220 for scanning of the antenna's beam any place within the conical field of view depicted by FIGS. 3A and 3B.

Figures 3A, 3B:
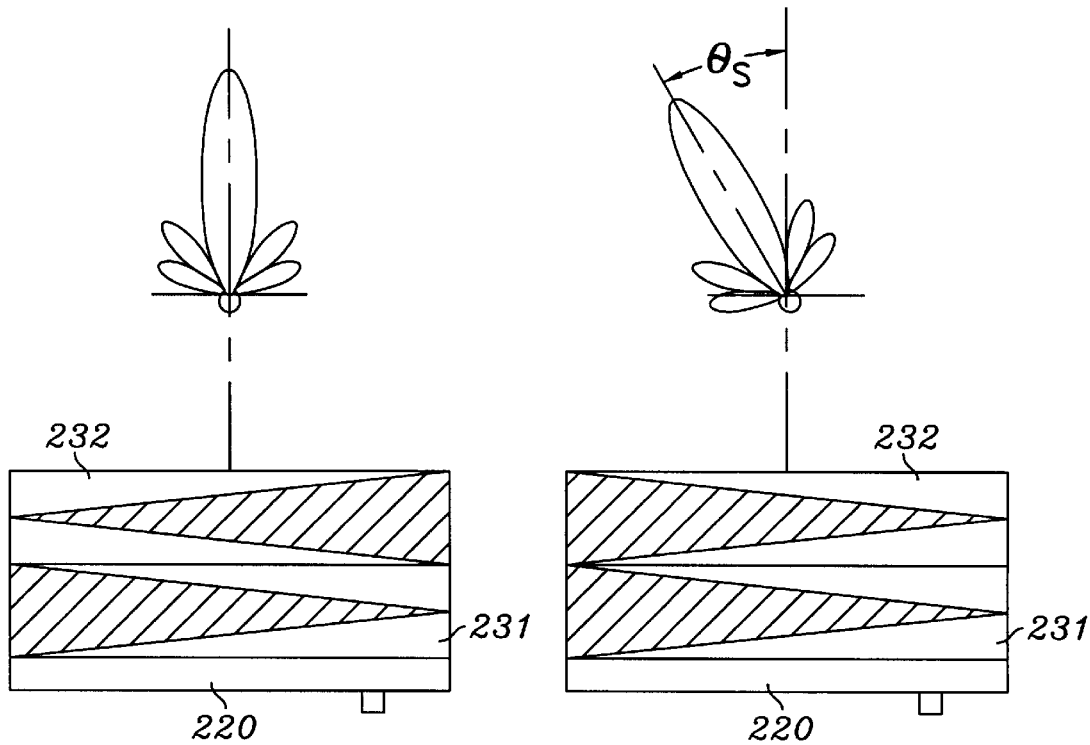
FIGS. 3A and 3B are pictorial views of the function of the array and the lenses.

It will be appreciated that the radome structure 211 which encases the antenna is transparent to RF signals and provides the support structure for journal bearing 219 at the end of coaxial shaft 215. The coaxial shafts 213, 214 and 215 are all made of nonconductive materials. The disk shaped lenses 231 and 232 have tapered transmission propagation delay as depicted in FIGS. 3A and 3B and shown by the shaded areas. This causes the beam to scan in the direction of most delay through the lenses as shown in FIGS. 3A and 3B. The lenses 231 and 232 shown in FIG. 3 are independent rotatable structures, the propagational delay through lenses 231, 231 are related to the material index of refraction and thickness. This may be achieved by variation in the dielectric constant or through synthetic dielectrics. Dipole radiators 220A, 220B of array assembly 220 shown in FIGS. 4A, 4B and 4C are tuned to each operational frequency band. The dipole's length "ld", determined by elements 222A and 222B, is resonant at the frequency of operation. These dipole assemblies 222A, 222B are interconnected by a distribution network of low impedance transmission lines of equal electrical lengths from the feed point of the array.

Connectors 216, 217 and 218 are the interface with the antenna. Connector 216 accommodates one polarization and frequency band and the other connector 217 accommodates the orthogonal (opposite) polarization and second frequency band. Connector 218 interfaces with the motor gear assembly 212, which controls beam scan and polarization alignment via rotation of coaxial shafts 213, 214 and 215.

The uniform spaced dipole radiators 220A, 220B of two array assemblies 220 are shown in FIGS. 4A, 4B and 4C.

Each dipole is connected by a transmission line in a manner that provides equal electric lengths from the feed point of the array. The transmission line length determines the resonant frequency of operation. For instance, where there are U-shaped square dipoles, each dipole is connected in the middle limb of the U with a line connected to a transmission line.

Dipole pairs are interconnected by balanced twin lead transmission lines 223 and 226, which are sized in width and separation to match the characteristic impedance of the resonant dipoles. It will be appreciated that broad-band dipoles are balanced radiators that need to be connected by balanced transmission lines.

The coaxial cable interfaces 216 and 217 to the antenna are unbalanced circuits. The transition from an unbalanced interface to the balanced radiators 220A and 220B are accommodated by an integrated balun/power divider circuit as depicted in FIG. 6.

It is seen in FIGS. 4A, 4B and 4C and 5A, 5B and 5C that the antenna array 220 is composed of a stack-up of a ground plane 221, spacer support material 222, circuit traces on sheets 223 and 224 separated by dielectric material substrates 227. The RF circuitry of the dipole array 220 is composed of coaxial, micro-strip and twin lead transmission lines.

FIGS. 4A, 4B and 4C show that there is a greater separation between the balanced transmission microstrip trace 223A and the balanced transmission microstrip ground plane 223B respectively of micro-strip than that of twin lead and dipoles 220A and 220B. The dotted lines show the trace on the lower surface of the substrate. This design lowers the signal attenuation in the distribution network of the array. This makes the antenna more efficient than the use of all twin-lead traces of equal separation.

In FIGS. 5A and 5B a circular cross-section is shown for the dipole array and the supporting structure applicable to the mobile antenna. FIG. 5C is a partial cross-section of the interface between the unbalanced coaxial transmission line and the balanced twin-lead transmission lines, the outer coaxial conductor 229 is the conductive connection to the ground plane 221 and the lower microstrip trace 229A of FIG. 6. The center coaxial conductor 230 connects to the upper microstrip trace 229B.

FIG. 6 depicts the relationship of balanced and unbalanced transmission line traces on multiple layered boards, 226 is the plated through connection of the lower microstrip trace, integrated within the structure is the balun/power divider network required for the array.

FIGS. 7A and 7B show the relative geometry of the dipoles required for polarization diversity. It is possible to use fewer lenses for the mobile antenna for simpler operation. The straight dipole antennas 220A and 220B respectively can be replaced with "bow-tie" shaped elements to provide an antenna bandwidth from 11 to 15 GHz. It would thus eliminate the need for separate X-band and Ku-band arrays. This reduces both the number of lenses required and number of rotating elements.

FIG. 8 shows the bow-tie dipole element which would replace the individual straight dipoles. Each half limb of the bow-tie is equivalent to each end limb of the U-shaped dipole. The transmission line is connected between the extremities of the bow-tie shape at about mid-way, namely, the narrow part of the bow-tie.

Flat Array Antenna

Presently, microwave communication systems employ reflector antennas with feedhorns to achieve medium to high-gain performance. These antennas require precise alignment between the feedhorn and reflector. In addition, the received beam has to be totally focused into the feedhorn by the reflector to achieve maximum performance from the aperture. The same is true for the transmit beam which has to be reflected by fully illuminating the surface of the reflector. As a result, these antennas are not as efficient in achieving maximum efficiency for a given aperture. These antennas are also labor intensive to install and are not as rugged as the flat array antenna of the present invention.

It has been recognized that a flat array antenna would overcome many of the drawbacks of a reflector antenna, however, up to now the flat array antenna has not achieved equivalent performance. There has been considerable difficulty in achieving the required gain and pattern from an array antenna to match the performance of an equivalent reflector antenna. The present invention overcomes the limitation of previous flat array antennas.

A unique approach reduces the typical transmission line path losses, power divide losses, and the transition between the unbalanced microwave feed and balanced twinlead dipole radiators. This is achieved by an integrated balun/power divider circuit.

Integration of X-band and Ku-band arrays have been conceived which eliminates any interference between the two bands. Maximum efficiency and gain is achieved with excellent beam patterns, without any distortion through cross coupling between the two frequency bands. This results in a low-cost, highly compact flat array antenna for use in a variety of fixed and mobile applications in the high-frequency bands, including Ka-band communications.

The present invention develops a means for realizing a low-weight, cost-effective flat plate antenna operating in both the X-band and Ku-band frequencies with polarization diversity.

A flat plate array antenna with balanced dipole radiating elements is packaged in a flat assembly between a radome, dielectric separator plate of required thickness and a metallic ground plane. For a nominal 32 db directivity flat array antenna, the minimum aperture size required would be $80\lambda^2$ at the lowest operating frequency.

Comparatively, the state of the prior art parabolic dish reflector type antennas have an aperture efficiency of approximately 55%. This would imply an 18" diameter dish antenna equivalent to a $255\lambda^2$ aperture size to achieve similar gain performance.

The state of the prior art in flat plate slotted waveguide arrays requires an aperture size of $180\lambda^2$ to achieve similar performance, and is an order of magnitude more expensive to develop and manufacture than other candidates.

For a 32 db gain and polarization diversity, the dipole array of the present invention requires approximately $145\lambda^2$ aperture size. For illustrative purposes, the present invention uses an array of 512 half-wave dipoles, placed a quarter-wave length ($\lambda/4$) above a flat plate ground plane in an array with ½" spacings for both the X-band and Ku-band frequencies. This array pattern allows use of photographic techniques, such as used for printed circuits, strip line traces and patches to obtain the dipoles and transmission lines on both sides of very thin sheets of polyester type material or duroid material.

A schematic of the front face of the X-band flat array trace is shown in FIG. 9, and the corresponding ground plane side is shown in FIG. 10. Similar drawings for the Ku-band transmit array front face is shown in FIG. 11 and the corresponding Ku-band ground plane trace is shown in FIG. 12.

FIGS. 9 and 10 could be traces etched respectively back-to-back on a single dielectric material. Similarly, traces of FIGS. 11 and 12 are back-to-back on a single dielectric material. Each of the traces are represented as a rectangular cross-section. This facilitates polarization of the respective signals from the X-band relative to the Ku-band.

FIGS. 13A and 13B show trace configuration details for four dipoles and connecting transmission lines, typical for a four-way power division. The X-band, Ku-band front and ground plane side arrays are accurately aligned and separated by a dielectric.

The sheets making up the array are both sandwiched between a radome and dielectric material $\lambda/4$ thickness above the ground plane as shown in FIG. 14 which is an antenna array assembly. The assembly is constituted by a back plate 300 forming a ground plane, a foam material 301, a sheet 302 for the X-band array, sheet 303 which is an insulation material, sheet 304 for the Ku-band, and a random face sheet 305. A clamping element 306 and bolt 307 is provided to secure the assembly together so that the overall depth is about 0.50 inches.

With the proposed antenna array both array theory and pattern beamwidth calculations, with losses evaluated and accounted for, show an aperture efficiency greater than 62% can be achieved.

If N is the number of elements in the X plane (16), M is the number of elements in the Y plane (32), De represents the element's directivity, De for X-band equals 3.2 and De for Ku-band equals 4.4. The directivity (DBI) equals 10 log N.M.De thus, the directivity at X-band equals 32.1 Dbi and the directivity at Ku-band equals 33.5 Dbi. The aperture efficiency is achieved with, for example, duroid type material, with the two arrays in turn separated by similar dielectric material and sandwiched over a ground plane. The ground plane, for example, is constructed from flat plate aluminum. The array elements can be arranged to maintain a maximum degree of flatness to avoid any distortion of the beam and reduction in gain. The resonant frequency for a terminal impedance of a $0.46\lambda$ dipole placed $\lambda/4$ above a ground plane is approximately 65+J0 ohms. When matched to a 65-ohm characteristic impedance transmission line, a VSWR less than 1.3:1 would be exhibited over a 10% bandwidth. This can also be done for 25-ohm and 50-ohm transmission lines.

Different Array Configurations

There are several other alternative arrangements for the present invention. Other implementations, for example, could include "bow-tie" type dipole elements that could be employed for different bandwidth characteristics depending on the contemplated applications.

Other arrangements of the array sandwich patterns depicted in FIG. 14 would be a side by side orientation of the X and Ku-band elements, instead of a sandwich. Different characteristic materials would exhibit different loss characteristics.

In the present invention standard calculations for the array configuration can optimize the array. The present invention is directed to a balanced array designed for achieving maximum gain and polarization diversity. The side lobe pattern is that of a defraction limited aperture to achieve maximum gain, with a 13 db side lobe. A cosine taper illumination would result in a lower side lobe level but also provide a wider beamwidth. Increasing the beamwidth allows a reduction in side lobes.

If desired, double transformations could be used to desensitize the array. The array could also be designed for various impedance levels. Silk screening can be achieved on a substrate material of approximately 9 inches×18 inches. The dipole array works well through a substrate. The dielectric is a flexible circuit material on which the traces are formed by copper cladding on each side. About one-half ounce of copper would be needed to form the traces for a 9 inch by 18 inch array.

The X-band and Ku-band arrays can be etched on both sides of a substrate or placed on individual laminated dielectric sheets. A bow-tie configuration at the individual dipole elements could be used in a mobile application to achieve wider bandwidth, with a lower resistance loss. This allows handling of both the X and Ku-band frequency in a simpler configuration. A full duplex arrangement would require both the X- and Ku-band as separate arrays.

By repeating the X-band array of FIGS. 9 and 10 a square receive only antenna could be achieved for direct broadcast receive only applications with both horizontal and vertical polarizations. A square array with double the aperture for both the X-band and Ku-band arrays of FIGS. 9, 10, 11 and 12 is possible to achieve higher gain and a transmit/receive antenna with both horizontal and vertical polarizations.

It is also apparent that the same symmetrical patterns with a standard or bow-tie dipole configuration could be arranged using standard approaches to achieve circular polarization. Thus a variety of flat array antennas can be produced for all polarizations desired.

By integrating the balun and power divide elements the percentage path loss can be kept independent of array size allowing higher gains to be achieved. The X-band and Ku-band over-lay arrangement can also be extended to achieve even more compact antennas at the Ku-band.

High-Speed Power Transmission Line Fault Location

The use of series capacitor banks has made it considerably more difficult for 60-cycle frequency or impedance-based fault location schemes to work effectively on EHV transmission lines. Transmission line conductor-mounted relay sensors provide for precise physical fault location even on series capacitance-compensated lines as disclosed in the present invention. These work by detecting traveling waves propagating in either direction from a line fault.

The traveling waves created by a fault on an EHV transmission line is a broad impulse that propagates at almost the speed of light and is characterized by the rate of rise of the leading edge, signal magnitude, and frequency spectral content. The typical frequency spectrum for a reflected wave would be between 30–400 KHz.

"Hot-stick" mountable sensors, 301, 302 and 303, FIG. 15, are installed on energized high voltage circuits as described in U.S. Pat. No. 4,709,339. These sensors are energized by the electromagnetic field surrounding the conductor. An air-core toroidal coil sensor senses current and a metalized housing would sense the charging current and hence the E-field.

The sensor signals at adjacent substations are synchronized via satellite signals to accuracies better than 0.5 micro-seconds.

Under normal conditions, the sensor would provide accurate synchronized measurements of phase angle, voltage, and current using high-speed digital signal processing. Conventional primary current and potential transformers are wired from a switch yard to auxiliary current and potential transformers in a control house. This causes phase shifts and signal delays resulting in inaccuracies in conventional relays and measurement devices. The invented sensors do not require either primary or auxiliary current and potential transformers, largely eliminating these inaccuracies.

Traveling waves are detected and time tagged by sensors at substations in the vicinity of the line fault. A time tagging accuracy of 0.3–0.5 micro-seconds at multiple stations allows precise location of faults to within a tower span. These sensors are time synchronized by the USAT communication terminals (which are synchronized to Global Positioning Satellite (GPS) signals for timing as described in the parent application) collocated either on the tower closest to the sensors or are in communication with the sensors through a local radio link.

Another option is to combine the USAT transceiver terminal described in the parent application with the sensor for direct mounting on the conductor with the USAT adjustable in azimuth and elevation beneath the sensor which are clamped around the high-voltage conductor.

A 9"×9" array antenna of the form described above is adequate for the small amounts of data to be collected and transmitted from an individual sensor. Both normal power flow measurements and fault location are performed by the same sensor hardware at a considerably lower cost than separate conventional devices.

The advanced relay scheme incorporating the USAT time synchronization accuracy reduces fault inspection and clearing times, is unaffected by high ground resistance, series capacitor banks, etc., provides faster service restoration even when there is no visual evidence of a fault, eliminates the problems of secondary reflections, provides quicker and more precise fault location and avoids safety hazards from mutual conductive coupling.

Traveling Wave Fault Location

FIG. 16 shows the traveling wave fault location scheme of the present invention.

Sensor module 301 S1 is directly mounted on the first phase of the first circuit in substation S1. Similarly 301 S2 represents the corresponding sensor module mounted on the same transmission line conductor connected to the first phase of the corresponding transmission line conductor in station S2. When a fault occurs at location F, at $T_i$, transient signals are generated by the fault.

The voltage waveform V1 shown in FIG. 17 exhibits a transient signal that is superimposed on the 60-cycle normal voltage waveform. The traveling wave is generated by an insulator flashover or fallen conductor, etc. The perturbed voltage waveform as shown in FIG. 17 has a high-frequency component that propagates along the line in both directions and is detected by the sensor modules 301 S1 first, assuming the fault is closer to substation S1, and would also be detected at Time TS2 by sensor module 301 S2 at substation S2.

The filter in sensor module 301 S1 removes the 60-cycle component and presents only the high-frequency component for detection by the steep wave front detector within the sensor module. The sensor module creates a time stamp as soon as the steep wave front is detected as a fault at Time TS1. In a similar manner the steep wave front is filtered and detected at Time TS2 by sensor module 301 S2, at substation S2.

Since the distance between substations S1 and S2 is known and the speed at which the traveling wave propagates is close to the speed of light, the travel time can be computed for a signal traveling between substations S1 and S2.

This travel time is shown as T (S2–S1) in FIG. 16. If the fault occurs at location F then the time that the signal takes to travel between F and substation S1 is proportional to the distance D (S1–F). Similarly the time (T S2) that the traveling wave takes to propagate from F to substation S2 is proportional to distance D (S2–F).

Thus as shown in FIG. 16 the propagation times for the fault signal to reach S1, namely T (S1), and the travel time for the propagating signal between S and S2, namely, T S2 can be readily calculated as follows.

$$T_{(S2-S1)} = \frac{D_{(S2-S1)}}{V_{tw}} = T_{S2} + T_{S1}$$

-continued $T_i$ = Time of Fault $V_{tw}$ = Velocity of traveling wave $T_{S1}$ = Time fault detected at station $S1$ $T_{S2}$ = Time fault detected at station $S2$ $$T_{S2} - T_{S1} = \frac{D_{(S1-F)}}{V_{(tw)}} \qquad T_{(S2)} = T_i + \frac{D_{(S2-F)}}{V_{tw}}$$

$$T_{(S2)} - T_{(S1)} = \frac{D_{(S2-F)}}{V_{tw}} - \frac{D_{(S1-F)}}{V_{tw}}$$

$$T_{(S2)} + T_{(S1)} = \frac{D_{(S2-S1)}}{V_{tw}}$$

$$T_{S2} = \frac{1}{2}\left[\frac{D_{(S2-F)} - D_{(S1-F)}}{V_{tw}} + \frac{D_{(S2-S1)}}{V_{tw}}\right] \quad (1)$$

$$T_{S1} = \frac{1}{2}\left[\frac{D_{(S2-S1)} - D_{(S2-F)}}{V_{tw}} + \frac{D_{(S1-F)}}{V_{tw}}\right] \quad (2)$$

$D_{(S1-F)}$ and $D_{(S2-F)}$ calculated from (1) and (2)

The distances between the fault and the respective substations can then be computed from equations 1 and 2 as shown in FIG. 16.

The propagation velocity of the traveling wave is approximately 300 meters per microsecond, which is approximately the speed of light.

The ultra small aperture terminal system described in the parent patent application provides GPS derived timing signals that synchronize all the sensor modules to an accuracy of approximately 0.3 microseconds. The sensor modules are therefore able to locate faults on transmission lines using the traveling waves generated by the fault to within approximately 300 meters. This is roughly the distance between the transmission towers on EHV transmission lines.

This method of detecting transmission line faults is superior to the prior art since it eliminates the inherent delays in signal propagation between primary and secondary current and potential transformers and auxiliary equipment inside the substation control house.

The present invention senses the transient and processes the fault signal reception time directly on the conductor of the incoming line at a station. This eliminates all the phase shifts and delays produced by wiring between the primary and secondary measurement circuitry within a conventional substation. Other methods that rely on existing substation primary and secondary metering equipment to perform the signal detection suffer from the inherent inaccuracies in fault propagation and detection through primary and secondary measurement circuitry.

The proposed traveling wave fault locating system when combined with the ultra small aperture terminal time synchronization accuracy, which is maintained by continuous updates through the network from a centralized GPS timing signal, offers the greatest accuracy at the lowest cost of any of the prior art.

General

The above description of the invention is illustrative only. Various changes in the application and details of the illustrative apparatus and method may be made within the scope of the appended claims without departing from the spirit of the invention.

For instance, by the term "flat" array is meant an array which is substantially planar or curvilinear. In some situations, the flat array may be curved to conform to a shape of a base member, for instance a cylindrically shaped sensor on a power transmission line. In that event, the dipole spacing or transmission line configuration may be varied to set up the appropriate configuration for the flat array. The flat array antenna can be used for communication application between terrestrial transceivers, or other satellite communications, for instance for television communications.

The invention is to be determined solely on the terms of the following claims. When such claims are formulated as system claims, these are to be understood in multiple different respects, namely respectively as either system claims, product claims and as method claims. Thus the term "system" should be understood to mean system, apparatus or method.

What is claimed is:

1. A communications system, comprising:
   (a) a hub terminal;
   (b) multiple remote terminals;
   (c) means for communication between the hub and remote terminals, including at least one satellite repeater, wherein the hub terminal communicates with the remote terminal through satellite repeater;
   (d) means for polling the remote terminals to initiate responses from the terminals in a particular polling sequence;
   (e) means for transmission of notifications, independent of the polling sequence;
   means for monitoring a signal-to-noise ratio of a signal transmitted from the hub terminal to the remote terminal; and
   means for limiting a change in the signal-to-noise ratio by activating additional multiplexing at the transmission means.

2. The communication system of claim 1, further comprising a power source, the power source being selected from a group comprising a solar array panel and induction coil interaction with power supply lines.

3. The communication system of claim 1, further comprising means, coupled to the hub terminal, for decoding signals from the multiple remote terminals substantially simultaneously.

4. The communication system of claim 1, further comprising a power source, the power source being selected from a group comprising a solar array panel and induction coil interaction with power supply lines.

5. A communications system, comprising:
   (a) a hub terminal;
   (b) multiple remote terminals;
   (c) means for communication between the hub and remote terminals, including at least one satellite repeater, wherein the hub terminal communicates with the remote terminal through satellite repeater;
   (d) means for polling the remote terminals to initiate responses from the terminals in a particular polling sequence;
   (e) means for transmission of notifications, independent of the polling sequence; and
   means for activating additional multiplexing within the transmission means through block addressing control of periodic transmissions from the hub terminal to the remote terminal.

6. The communication system of claim 5, further comprising means, coupled to the hub terminal, for decoding signals from the multiple remote terminals substantially simultaneously.

* * * * *